United States Patent
Maucec et al.

(10) Patent No.: US 8,619,499 B2
(45) Date of Patent: *Dec. 31, 2013

(54) SYSTEMS AND METHODS FOR MODELING 3D GEOLOGICAL STRUCTURES

(75) Inventors: Marko Maucec, Englewood, CO (US); Jeffrey M. Yarus, Houston, TX (US); Lu Ming Liang, Golden, CO (US)

(73) Assignee: Landmark Graphics Corporation, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/595,773

(22) Filed: Aug. 27, 2012
(Under 37 CFR 1.47)

(65) Prior Publication Data
US 2013/0027398 A1    Jan. 31, 2013

Related U.S. Application Data

(63) Continuation of application No. 12/710,253, filed on Feb. 22, 2010, now Pat. No. 8,274,859.

(51) Int. Cl.
*G01V 1/00* (2006.01)

(52) U.S. Cl.
CPC .............. *G01V 1/00* (2013.01); *G01V 2210/66* (2013.01); *G01V 2210/665* (2013.01)
USPC .......................................................... 367/43

(58) Field of Classification Search
USPC ............. 367/38, 43, 73; 702/5; 345/419, 606, 345/611
See application file for complete search history.

(56) References Cited

U.S. PATENT DOCUMENTS

| | | | |
|---|---|---|---|
| 7,050,612 B2 | 5/2006 | Hale | |
| 7,379,626 B2 * | 5/2008 | Lachine et al. | 382/300 |
| 8,274,859 B2 * | 9/2012 | Maucec et al. | 367/43 |
| 2004/0006450 A1 | 1/2004 | Hale | |
| 2004/0075659 A1 | 4/2004 | Taubin | |
| 2006/0158447 A1 | 7/2006 | McGraw et al. | |
| 2007/0061117 A1 | 3/2007 | Landis, Jr. et al. | |
| 2008/0212838 A1 | 9/2008 | Frigerio | |
| 2009/0177402 A1 | 7/2009 | Fitzgerald et al. | |
| 2010/0161232 A1 * | 6/2010 | Chen et al. | 702/16 |

FOREIGN PATENT DOCUMENTS

WO    2009151441 A1    12/2009

OTHER PUBLICATIONS

CTEAM; Computational Methods; 2010 CWP Annual Meeting, Colorado School of Mines, Golden, CO; May 17-20, 2010; 14 pgs.
Rotation; Rotation-by-Shearing; Mar. 18, 2006; 6 pgs.
Hale, David; Image-Guided Blended Neighbor Interpolation; CWP Project Review; CWP-634; 2009; 14 pgs; Center for Wave Phenomena, Colorado School of Mines; Golden, Colorado 80401 USA.
Hale, David; Atomic Images—A Method for Meshing Digital Images; Proceedings, 10th International Meshing Roundtable; 2001; 12 pgs.

(Continued)

*Primary Examiner* — Krystine Breier
(74) *Attorney, Agent, or Firm* — Crain, Caton & James; Bradley A. Misley

(57) ABSTRACT

Systems and methods for modeling a three-dimensional (3D) geological structure to improve maximum continuity interpolation. An integration method describes local anisotropic effects and introduces interpolation techniques to perform the interpolation between two points of interest along a direction of maximum continuity and across fault surfaces.

14 Claims, 6 Drawing Sheets

(56) References Cited

OTHER PUBLICATIONS

Ruger, Adreas & Hale, David; Meshing for Velocity Modeling and Ray Tracing in Complex Velocity Fields; Geophysics 71, 1 U1; 2006; 4 pgs; Landmark Graphics.

Young, Lee W.; The International Search Report and The Written Opinion of the International Searching Authority (PCT/US2011/20569); Mar. 25, 2011; 13 pgs; PCT/ISA/US; Commissioner for Patents, Alexandria, VA.

Fehmers, Gijs C. & Hocker, Christian F.W.; Fast Structural Interpretation With Structure-Oriented Filtering; Geophysics; Jul.-Aug. 2003; pp. 1286-1293; vol. 68, No. 4; Shell International Exploration and Production B.V.; Rijswijk; The Netherlands.

Weickert, Joachim; Coherence-Enhancing Diffusion Filtering; International Journal of Computer Vision; 1999; pp. 111-127; 31 (2/3); Kluwer Academic Publishers; The Netherlands.

Hale, David ; Recursive Gaussian Filters; CWP Project Review; 2006; pp. 1-10; CWP-546; Center for Wave Phenomena, Colorado School of Mines; Golden, Colorado 80401 USA.

Konukoglu, Ender, Sermesant, Maxime; Clatz, Olivier; Peyrat, Jean-Marc; Delingette; Herve & Ayache, Nicholas; A Recursive Anisotropic Fast Marching Approach to Reaction Diffusion Equation: Application to Tumor Growth Modeling; 2007; 12 pgs;; Asclepios Research Project; France.

Jeong, Won-Ki & Whitaker, Ross T; A Fast Iterative Method for a Class of Hamilton-Jacobi Equations on Parallel Systems; Under Review:SIAM Journal of Scientific Computing; Apr. 18, 2007; 25 pgs; University of Utah Technical Report UUCS-07-010; School of Computinig; University of Utah.

Durand, Fredo;The Art and Science of Depiction; MIT LCS Graphics Group; 2000; 24 pgs.

Zeng, Gang; Paris, Sylvain; Quan, Long & Sillion, Francois; Accurate and Scalable Surface Representation and Reconstruction from Images; IEEE Transaction on Pattern Analysis and Machine Intelligence; Nov. 18, 2005; 36 pgs.; Massachusetts Institute of Technology; Cambridge, MA 02139.

Maucec, Marko; Douma, Sippe; Hohl; Detlef; Leguijt; Jaap; Jimenez, Eduardo A. & Datta-Gupta, Akhil; Streamline-Based History Matching and Uncertainty: Markov-chain Monte Carlo Study of an Offshore Turbidite Oil Field; Proceedings SPE ATCE; 2007; 16 pgs.; SPE 109943; SPE Annual Technical Conference; Anaheim, CA.

Strebelle, Sebastien & Journal, Andre G.; Reservoir Modeling Using Multiple-Point Statistics; Proceedings SPE ATCE; 2007; 11 pgs.; SPE 71324; SPE Annual Technical Conference; New Orleans, LA.

Remy, Nicolas; S-Gems: The Stanford Geostatistical Modeling Software: A Tool for New Algorithms Development; PhD Thesis-Stanford University; 2004; pp. 865-871; Springer; The Netherlands.

Petrel 2009-What's New—Realize the Power of Petrel 2009 Seismic to Simulation Software; 2009; 4 pgs.; Schlumberger.

Hale, Dave; A Method for Estimating Apparent Displacement Vectors From Time-Lapse Seismic Images; 2007; 12 pgs.; CWP-566; Center for Wave Phenomena, Colorado School of Mines; Golden, CO 80401 USA.

Hocker, Christian & Fehmers, Gijs; Fast Structural Interpretation With Structure-Oriented Filtering; The Leading Edge; Mar. 2002; pp. 238-243.

Article 34 Amendment and Response to The International Search Report and The Written Opinion of the International Searching Authority (PCT/US2011/20569); Sep. 21, 2011; 9 pgs; PCT/ISA/US; Commissioner for Patents, Alexandria, VA.

Vliet, Lucas J. and Verbeek, Piet W. Estimators for Orientation and Anisotropy in Digitized Images, ASCI 1995, Proceedings of the first Conference of the Advanced School for Computing and Imaging, Heijen, The Netherlands, May 16-18, 1995, 10 pages.

Liang, Luming; Hale, Dave; Maucec, Marko; Towards Determination of Displacement Field from Seismic Image, Oct. 12, 2009, 129 pages.

Keith, Jack; International Preliminary Report on Patentability; PCT/US11/20569; Mar. 2, 2012; 18 pgs.

\* cited by examiner

SYSTEMS AND METHODS FOR MODELING 3D GEOLOGICAL STRUCTURES

CROSS-REFERENCE TO RELATED APPLICATIONS

The priority of U.S. patent application Ser. No. 12/710,253, filed on Feb. 22, 2010, is hereby claimed and the specifications thereof are incorporated herein by reference.

STATEMENT REGARDING FEDERALLY SPONSORED RESEARCH

Not applicable.

FIELD OF THE INVENTION

The present invention generally relates to modeling three-dimensional (3D) geological structures. More particularly, the present invention relates to an integration method for maximum continuity interpolation in 3D geological modeling.

BACKGROUND

Conventionally, geostatistical software describes the pattern of spatial variation in geological properties (e.g. porosity and permeability) using a variogram model that quantifies the average of expected variability as a function of distance and direction. In reservoirs, where the geological characteristics are very continuous and easily correlated from well to well, the range (or scale), of correlation will be large and in reservoirs, where the geological characteristics change quickly over short distances, the range (or scale) of correlation will be smaller.

In certain geological environments, the range of correlation may be directionally independent. This phenomenon is very common in sedimentary environments, especially in those where the primary mechanism of transport during sediment deposition is wind or water, which results in highly channelized structures such as deltaic channels, fluvial deposits, turbidites and the like. These environments usually demonstrate a large degree of correlation variation between directions along the channel axis and perpendicular to the channel axis. The principles of conventional geostatistical practice, embedded in the majority of commercial tools for geological modeling presently available on the market, require selection of a single direction of maximum continuity, which is an average for the entire domain under study.

Traditional reservoir modeling techniques use simplified two-point statistics to represent geological structures with complex geometrical configurations, such as deltaic channels, fluvial deposits, turbidites and shale drapes. The two-point correlation is modeled through the definition of a variogram, which makes the description of the above-mentioned structures highly challenging if not impossible. One benefit of two-point geostatistical methods is their speed. One technique, for example, utilizes the Fourier-filter based method, which is described in an article written by M. Maueec, et. al. called "Streamline-based History Matching and Uncertainty: Markov-Chain Monte Carlo Study of an Offshore Turbidite Oil Field," and is capable of generating a new realization of permeability field with large numbers of variables ($\sim 10^6$) within a few seconds. Although this technique is more efficient than traditional well-known algorithms, like Cholesky decomposition, it is not suitable for integration into workflows for dynamic inversion and automated history matching of reservoir models due, in part, to its dependence on the use of variogram definition.

Within the last decade, advances have been made in the form of multi-point geostatistics (MPS). MPS technology uses correlations between multiple locations at the same time to reproduce volume-variance relationship and model realizations, which are conditioned to local sample data. Examples of MPS technology combine codes like SNESIM and S-GeMS. The latter, for example, is dedicated to the local optimization of parameters involved in variogram-based models to take into account local structural characteristics of the data. MPS technology, however, still has its disadvantages such as, for example: a) dependence on the training image or training data set; and b) very long computational times for generating new geological model/realization.

More recently, Landmark Graphics has developed technology for three-dimensional volumetric modeling of geological properties using a Maximum Continuity Field (MCF). This technology is more commonly referred to as Point Vector technology, which is described in International Patent Application Publication No. WO2009/151441 and is incorporated herein by reference. The Point Vector technology introduces several advantages that enable a user to: i) direct control over local continuity directions; ii) interactively operate with "geologically intuitive" datasets, such as layering intervals, projection maps and hand drawings through a MCF; and iii) retain the maximum fidelity of a geological model by postponing the creation of a grid/mesh until the final stage of static model building immediately before integrating the static model into a dynamic model (reservoir simulator). The reservoir property modeling does not need a standard grid but only the correct distance between the points to estimate/simulate the property and the data around it.

The current Point Vector technology basically introduces a solution, commonly referred to as an "80% solution," which is based on the approach of simply reorienting the axes of a variogram model to the local direction specified by the user. In geological structures with a high degree of local anisotropy (e.g. meandering channels), the direction of maximum continuity significantly changes locally for highly meandering channels. The 80% solution has no way of knowing how to look beyond the channel corner. The estimation of the correct distance in such geological structures requires the introduction of curvilinear distances because the minimum distance between two points in geological formations is not always a straight line (i.e. Euclidean distance) and may be curvilinear—depending on the local anisotropy field. The remaining challenges are: i) how to calculate the shortest distance between two points of interest in a grid-less model of a geological structure; and ii) which direction/orientation to use to correctly describe the local anisotropy effects.

SUMMARY OF THE INVENTION

The present invention meets the above needs and overcomes one or more deficiencies in the prior art by applying an integration method to calculate the shortest distance between two points of interest in a grid-less model of a geological structure and to determine which direction/orientation to use for correctly describing the local anisotropy effects.

In one embodiment, the present invention includes a method for modeling a three-dimensional ("3D") geological structure that comprises: i) calculating a structure and diffusion tensor field for a digitized image of the geological structure; ii) processing the digitized image to form an enhanced image; iii) calculating a fault displacement field for the digitized image using a computer processor; and iv) interpolating the structure and diffusion tensor field, the enhanced image and the fault displacement field to produce a 3D geological model.

In another embodiment, the present invention includes a non-transitory computer readable medium tangibly carrying computer executable instructions for modeling a three-dimensional ("3D") geological structure. The instructions are executable to implement i) calculating a structure and diffusion tensor field for a digitized image of the geological structure; ii) processing the digitized image to form an enhanced image; iii) calculating a fault displacement field for the digitized image; and iv) interpolating the structure and diffusion tensor field, the enhanced image and the fault displacement field to produce a 3D geological model.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order.

Method Description

The following description includes one or more methods (hereinafter generally referred to as an "integration method") for integrating the Point Vector technology and curvilinear point-to-point (CPP) interpolation techniques, which are well known in the art, through data abstraction to merge a broad range of available datasets and structures. An image digitization platform is disclosed with a generic I/O data stream, which is unified for interpolation. The integration method provides a unique tool in the field of 3D geological modeling.

Figure 1:
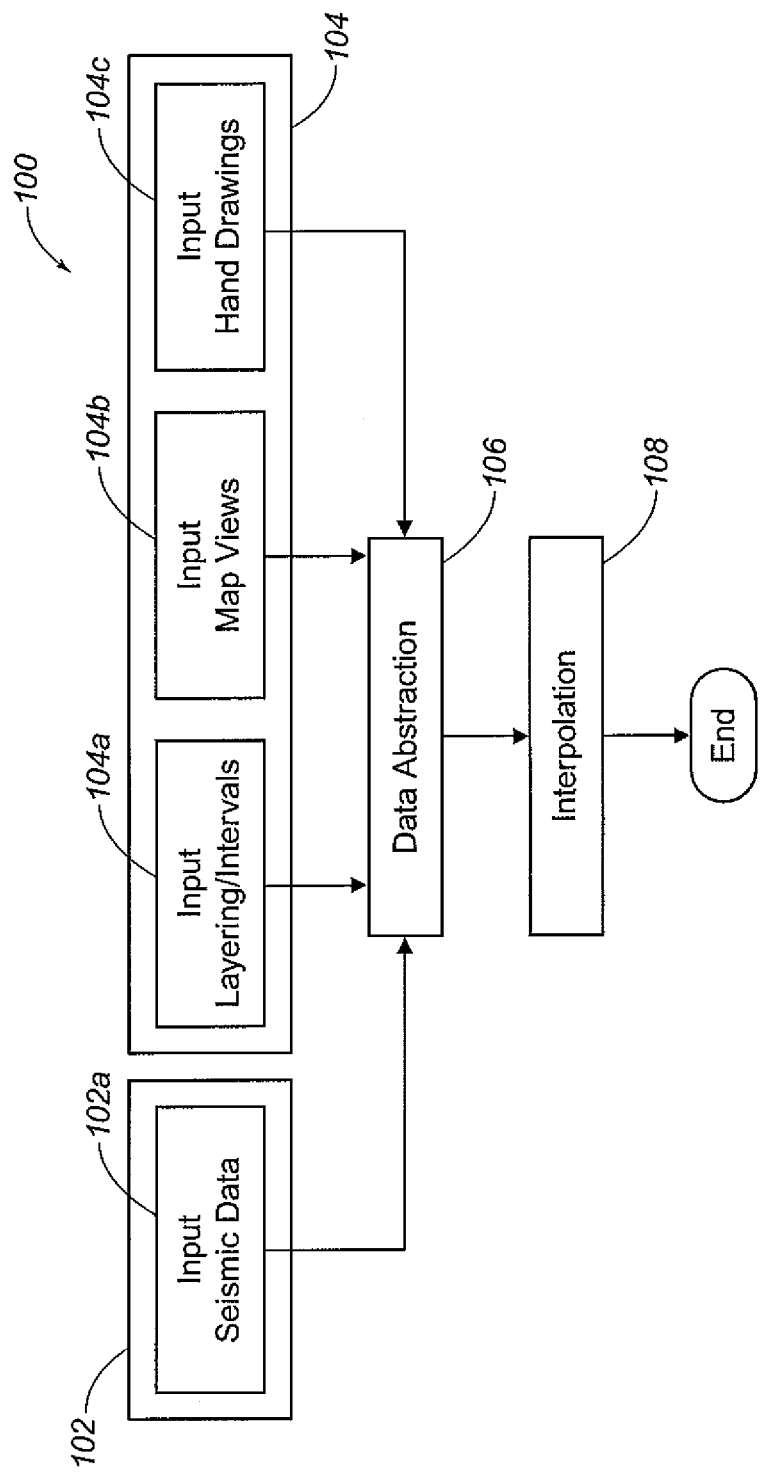
FIG. 1 is a flow diagram illustrating one embodiment of a method for implementing the preset invention.

Referring now to FIG. 1, a flow diagram illustrates one embodiment of a method 100 for implementing the present invention. The method 100 represents an integration method for 3D geological modeling, which accounts for multiple sources and types of geological and structural information. Such information may include, for example, intuitive hand drawings of structural frameworks and high-resolution seismic data images.

Figure 7:
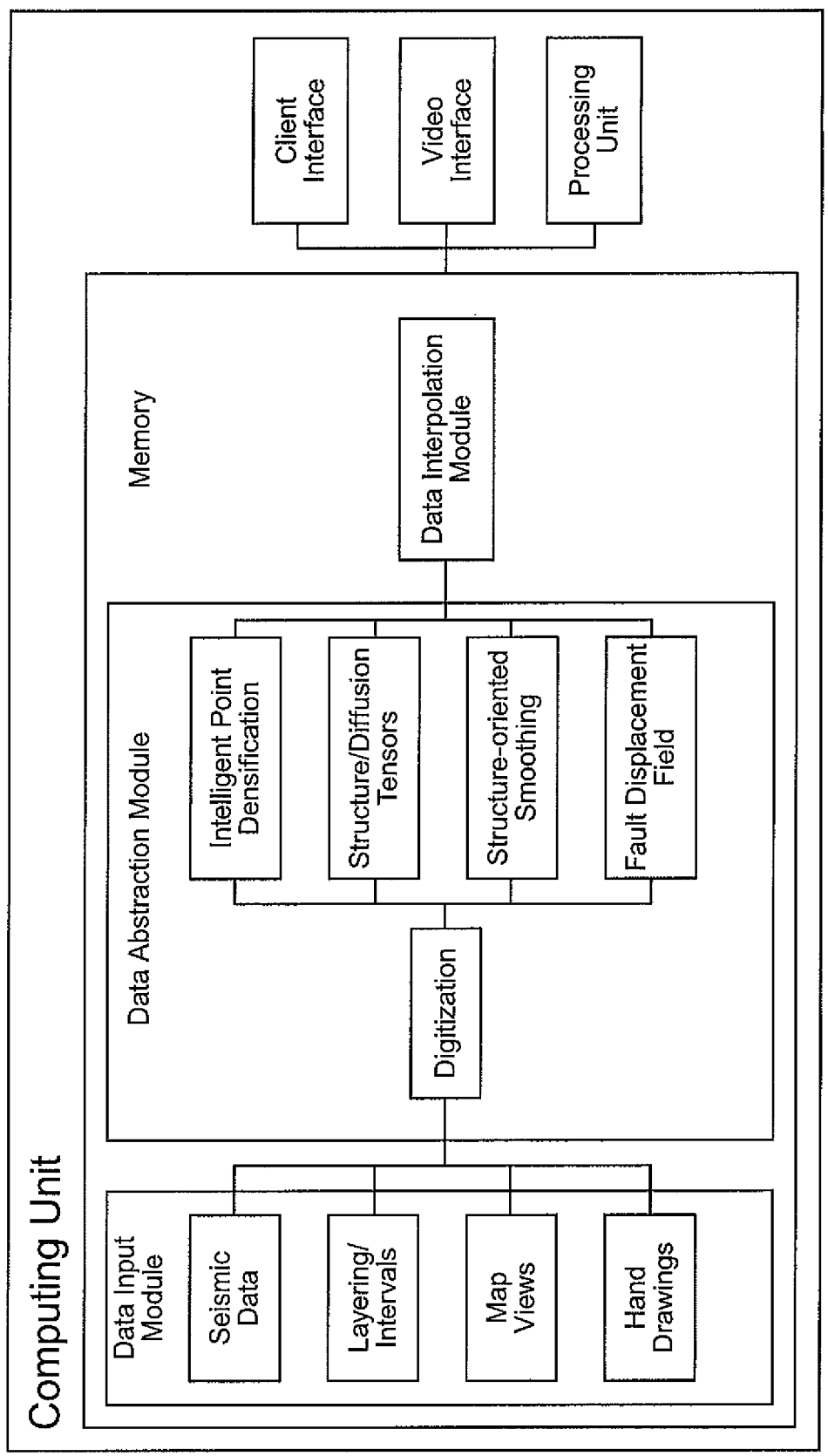
FIG. 7 is a block diagram illustrating one embodiment of a system for implementing the present invention.

In step 102, structural information such as, for example, high-resolution seismic data, may be selected as input data for the method 100 using the client interface and/or the video interface described in reference to FIG. 7. The seismic data may contain structural information used for CPP interpolation and structure-oriented smoothing.

Figure 3:
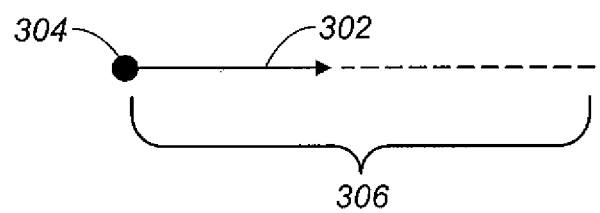
FIG. 3 is a schematic illustration of a maximum continuity vector.

In step 104, other types and formats of geological and structural information such as, for example i) layering intervals (104a), which represent a vertical space bounded by 2 geological surfaces; ii) map views (104b) of channel limits; and iii) intuitive hand drawings (104c) of structural frameworks (e.g. vectors in a specific portion of a volume-of-interest) may be selected as input data for the method 100 using the client interface and/or the video interface described in reference to FIG. 7. The geological and structural information selected in step 104 may be based on a single direction of maximum continuity using a Maximum Continuity Field in the manner described in International Patent Application Publication No. WO2009/151441 A1. By definition, the direction of maximum continuity is the direction along which the property of interest is the most likely to stay the same when moving away from the location of the vector along the direction of the vector as illustrated in FIG. 3. In other words, it defines implicit relations between locations in the geological model for property modeling purposes.

In FIG. 3, a maximum continuity vector 302 has a location 304, a magnitude, a direction and a correlation (length) 306. The correlation (length) of the vector 302 coincides with the long range of the variogram model. To preserve the vector information in channelized, highly meandering geological structures with a high degree of local anisotropy, the axes of the variogram model could be intuitively reoriented to the specified local direction in the manner proposed in International Patent Application Publication No. WO20091151441 A1.

Figure 2:
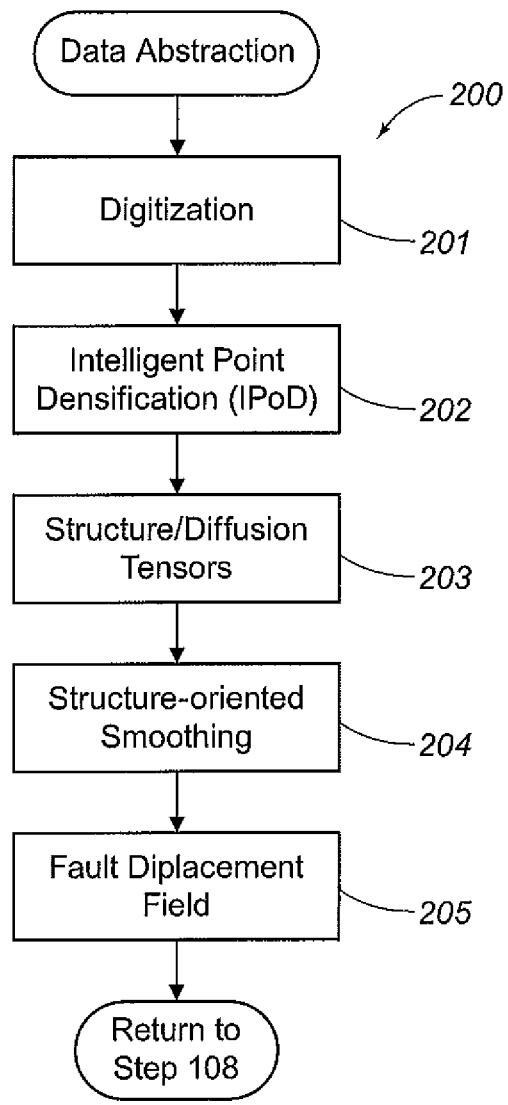
FIG. 2 is a flow diagram illustrating one embodiment of a method for implementing step 106 in FIG. 1.

In step 106, data abstraction is performed on the input data selected in steps 102 and/or 104 in the manner further described in reference to FIG. 2. Data abstraction is performed because the input data selected in steps 102 and/or 104 usually appear in very different modes or resolution and, in order to deploy the input data during the interpolation step 108, a generalization or abstraction of the input data is required.

In step 108, CPP interpolation such as, for example, natural-neighbor interpolation or image-guided-blended-neighbor interpolation is performed on the results from step 106. In one embodiment, the interpolation applies a two-step blending of tensor field data: 1) any anisotropic Eikonal equation, which is well known in the art, is solved for the minimum travel time from a sampled point to a known data point (i.e. well data/location) by methods well known in the art such as, for example, the Dijkstra-based Fast Marching Method (FMM); and 2) an iterative conjugate-gradient method, which is well known in the art, is used to solve for a blended neighbor interpolant, which is a derivation of a pressure equation. The integration of an underlying structure/diffusion tensor field and structure-oriented anisotropy smoothing postulates an important analogy between the Point Vector technology and CPP interpolation: correlation (length or range) of a maximum continuity vector is proportional to the maximum eigenvalue of diffusion tensor D, which is aligned with the structural orientation (i.e. dominant direction of structure tensor or local linear diffusivity). The main idea is to align the principal axes of diffusion with the orientation of the image. The diffusion tensor D should be constructed such that its eigenvectors follow local orientation of the image.

Figure 6:
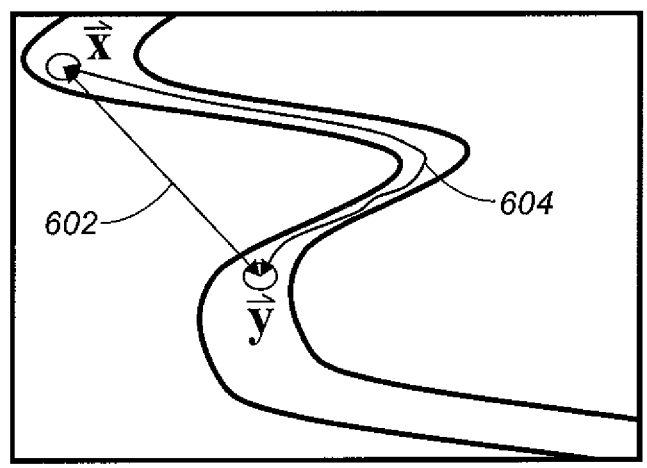
FIG. 6 is a schematic diagram comparing Curvilinear distance and Euclidean distance for illustrating step 108 in FIG. 1.

When applied to geological modeling, standard, Euclidean-based, point-to-point interpolation of reservoir properties could yield erroneous results because complex-underlying geological structures (e.g. channels) are not honored. In other words, Euclidean-based interpolation does not honor sinuosity, which is a prevalent feature of a meandering channel. By blending the tensor field data (e.g. structure/diffusion) to guide the interpolation, a major improvement in the physical accuracy of geological modeling is achieved. As illustrated in FIG. 6, this is achieved by solving the curvilinear distance 604. The curvilinear distance 604 represents a constrained Euclidean distance between two points $(\vec{x}, \vec{y})$ along an optimal trajectory. The curvilinear distance 604 may be solved using: $t(\vec{x}, \vec{y}) < t_m(\vec{y})$ where $t$ and $t_m$ represent the time (t) at $(\vec{x}, \vec{y})$ and the minimal travel time $(t_m)$ at $(\vec{y})$ respectively. Optionally, the curvilinear distance 604 may be solved using the solution to the anisotropic Eikonal equation for a minimum travel time $(t_m)$ along the optimal trajectory. The Euclidean distance 602 solves for the linear distance between two points) $(\vec{x}, \vec{y})$ and is inaccurate for channelized features.

To date, CPP interpolation has only been implemented using a seismic data image as the underlying structural input. The integration method therefore, brings together other types and formats of geological and structural data (e.g. layering intervals, projection maps and hand drawings) as the input data for interpolation.

Referring now to FIG. 2, a flow diagram illustrates one embodiment of a method 200 for implementing step 106 in FIG. 1.

In step 201, an image of a geological structure represented by the input data is digitized using any standard method well known in the art for representing an image by a discrete set of its points or samples such as, for example, rasterizing or image compression. The fundamental feature is to render a generic image format compatible with interpolation in step 108.

In step 202, the digitized image from step 201 is processed using intelligent point densification (IPoD). IPoD is an improvement of the atomic-meshing techniques described in U.S. Pat. No. 7,050,612, which is incorporated herein by reference. IPoD is generally used to: 1) initialize the sample point location by filling the space spanned by the digitized image with a pseudo-regular lattice of points, where the nominal distance between the point and its nearest neighbors varies consistently with the density of structural features in the digitized image; and 2) optimize the sample point location by moving the points within the space spanned by the digitized image to minimize a total potential energy, defined to be a weighted sum of a point potential energy for each sample point and a potential energy for the digitized image. The details of the sample point initialization and potential energy minimization algorithms are given in U.S. Pat. No. 7,050,612. The advantages of IPoD over standard atomic meshing is that it is used strictly for the initialization and optimization of sample point location. In this manner, the step of generating the actual triangulated mesh is omitted. The standard atomic meshing method connects the optimized sample points location by triangulation, which may be Delaunay triangulation or any other standard technique for triangulation, that is well known in the art, to form a mesh of sample points. However, generating a triangulated mesh is a computationally demanding procedure and may require special rendering techniques to correct for artifacts as described in the article written by A. Rueger and D. Hale called "Meshing for Velocity Modeling and Ray-Tracing in Complex Velocity Fields." According to Point Vector technology, the sample points are generated on a regular square grid and are randomly or evenly distributed within the volume-of-interest (VOI). Because IPoD is computationally less demanding than atomic meshing, it is anticipated that IPoD will generate about ⅓₀₀th the number of sample points than generated using the Point Vector technology. On a typical seismic data image, this can result in an increase in computational speed by a factor of 300.

In step 203, a structure and diffusion tensor field is calculated for the digitized image from step 201 using methods well known in the art. The individually calculated tensors for the tensor field are linked with the corresponding sample point initialized and optimized in step 202 by IPoD. If the technique applied is the "nearest neighbor" search, then the tensor is linked to the nearest neighbor sample point. If the technique applied is the "natural neighbor" search, then the tensor is linked to the natural neighbor sample point. Both the nearest-neighbor search and natural-neighbor search techniques are well known in the art. The metric tensor field is the link between distance and time and represents the coherence, orientation and dimensionality of features in the image, which guide the interpolation in step 108. The tensor field alters interpolation so that known sample values within spatially coherent image features are given more weight than values on opposite sides of such features or where the image is less coherent. Any underlying tensor field needs some underlying guiding representation in a computer such as, for example, a drawing, photograph, or other image. If derived from a seismic data image, the tensor field might be sampled with resolution of the seismic data image. Alternatively, the tensor field may be sampled more coarsely/cleverly using, for example, IPoD. This means that the tensor field will be sampled with the lower resolution only at the image locations determined by the optimized locations of the sample points from step 202.

In step 204, the digitized image from step 201 is processed using structure-oriented smoothing along structures that are apparent in the image (i.e., calculated in the form of a structure and diffusion tensor field in step 203), which enhances structural features and preserves important discontinuities such as, for example, faults or channels. For this step, a broad spectrum of well-known filtering algorithms may be used such as, for example: i) coherency-enhancing anisotropic filters; ii) structure-oriented interpretation filters (i.e. van Gogh filters); iii) recursive (anisotropic) Gaussian filters; and iv) novel implementations of bilateral filters.

In step 205, a fault displacement field (FDF) for the digitized image from step 201 is calculated in the manner described below. The FDF is merged with the results from step 203 and step 204, which is returned to step 108 in FIG. 1 for interpolation. Traditional seismic interpretation methods focus on the detection of the fault line in the seismic data image through, for example, coherence methods. Calculating an FDF, however, corresponds to tracing the MCF through the fault line (in 2D) or through the fault surface (in 3D). Here, the problem is addressed from the perspective of calculating the displacement vector field on the digitized image and extracting the fault-displacement component of such field based on a criterion which, for example, distinguishes between the fault throw and a dipping layer. In this manner, step 205 may be applied to fault line/surface detection in the seismic data image as well as to any other format of digitized data pertaining to structural information (e.g., layering intervals, projection maps and hand drawings).

The FDF is therefore, calculated by searching for the apparent displacement vectors in the image and searching for the locations of peaks of local cross-correlations between adjacent, that is vertical, image traces. The FDF constrains fault vectors, which vary smoothly within a fault that is in the direction of the fault. As a generalization to non-vertical faults, a correlation smoothing window is applied, which is aligned with a lag vector. In other words, smoothing is applied for any lag vector in the direction of that vector by shearing where the correlation is done trace-by-trace and is as fast as if it was done for the vertical faults. Shearing is a well known concept used in computer graphics algorithms.

Figure 4A:
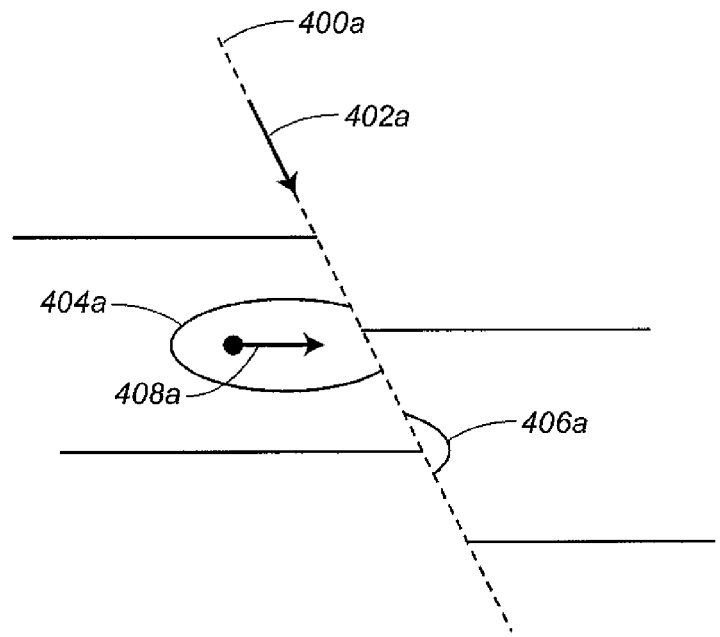
FIG. 4A is a schematic diagram illustrating the application of Point Vector technology for tracing a Maximum Continuity Field over a fault line.
Figure 4B:
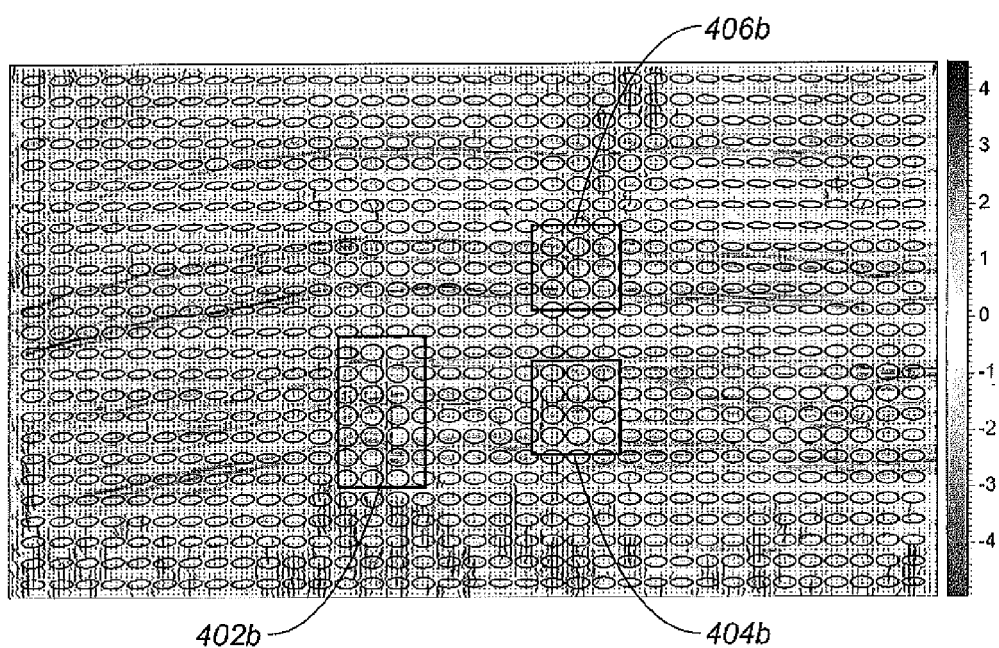
FIG. 4B is a seismic data image illustrating the loss of directional information as a result of using the Point Vector technology.

Referring now to FIG. 4A, the application of the Point Vector technology is illustrated for tracing the data-searched region 404a and the associated MCF 408a over a fault line 400a from region 404a to region 406a by displaying region 404a of the search and following the fault throw vector 402a to region 406a. Because this operation has to be performed on multiple-fault lines in a VOI for the entire MCF, it is extremely time-consuming and hard to efficiently implement in practice. As illustrated in FIG. 4B, which is a 2D seismic data image representing amplitude, the calculated structure and diffusion tensor field, represented by the ellipsoids, does not continue through the fault line. The areas represented by 402b, 404b and 406b reveal the areas where the directional information is lost. In other words, as the ellipsoids become less elongated, the information on directionality of the tensor field is lost on the fault line and discontinues tracing the MCF. By calculating the FDF in step 205, tracing the MCF over fault lines is generically applicable to any underlying structural representation in a digital image. Step 205 represents an improvement over the Point Vector technology, which does not require user pre-defined input for fault vectors and associated fault throws, which are required by the use of the Point Vector technology.

Figure 5A:
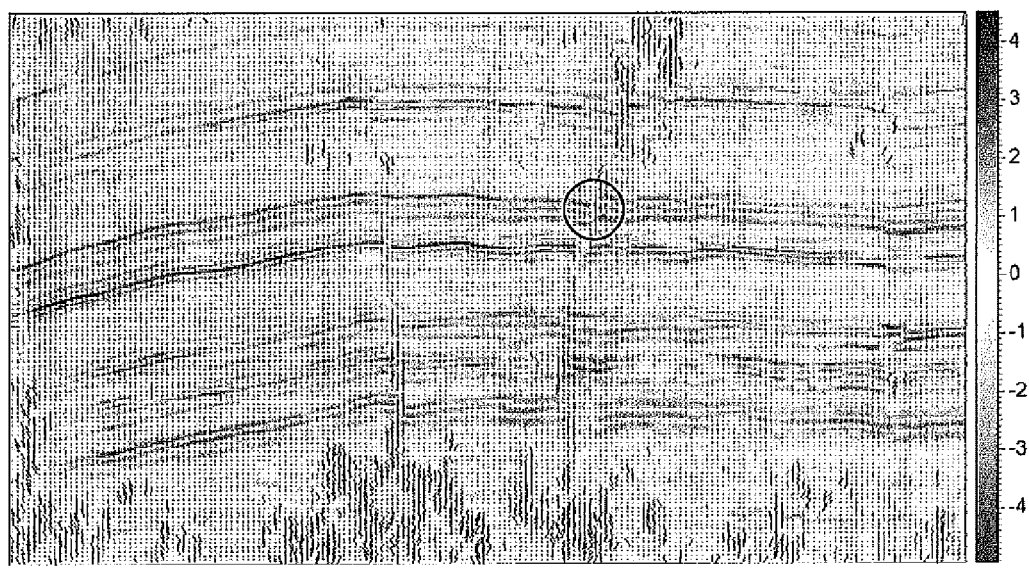
FIG. 5A is a seismic data image illustrating a fault displacement field calculated according to step 205 in FIG. 2.

Referring now to FIG. 5A, a seismic data image illustrates a fault displacement field calculated according to step 205 on amplitude seismic data.

Figure 5B:
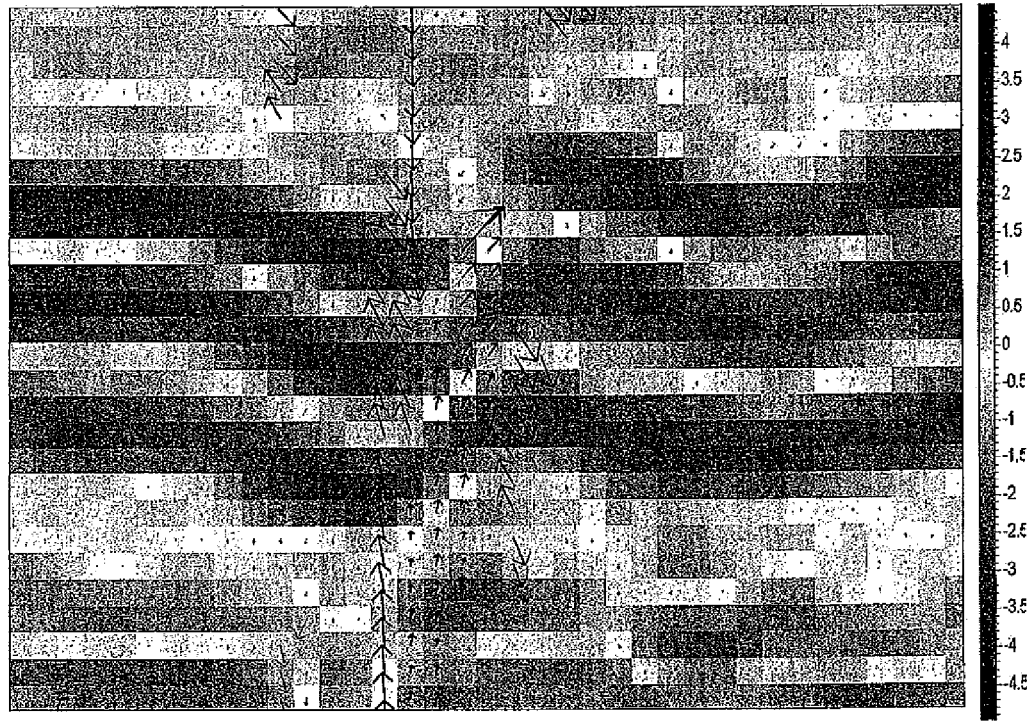
FIG. 5B is an enlarged image of the area circled in FIG. 5A illustrating the directional information for the fault displacement field.

Referring now to FIG. 5B, an enlarged image of the area circled in FIG. 5A illustrates the directional information for the fault displacement field. For clarity, the directionality information (i.e., vector arrows) are shown in FIG. 5B. The vector arrows represent the calculated displacement vectors. It is evident from the absolute length of the vector arrows that the displacement is merely associated with the high-gradient-change features (e.g. fault throws), but not with the tilt variation of horizontal layering where the length of the vector arrows is reduced. This is the preferred behavior because the displacement vector field is envisioned as the structural property.

The present invention is distinguished from existing technologies on the market by the integration of: i) Maximum Continuity Fields (MCF); ii) Intelligent Point Densification (IPoD); iii) fault displacement fields (FDF); and iv) CPP interpolation. The integration method of the present invention therefore: i) describes the local anisotropy effects by introducing the Maximum Continuity Field and Fault Displacement Field based on underlying structural information and ii) introduces the CPP interpolation techniques to perform the interpolation between two points of interest along the direction of maximum continuity and across the fault surfaces.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. DecisionSpace Earth Modeling (DSEM™), which is a commercial software application marketed by Landmark Graphics, may be used as an interface application to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire and/or through any of a variety of networks such as the Internet.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Referring now to FIG. 7, a block diagram of a system for implementing the present invention on a computer is illustrated. The system includes a computing unit, sometimes referred to a computing system, which contains memory, application programs, a client interface, a video interface and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 1-2. The memory therefore, primarily includes a data input module, an abstraction module and a data interpolation module, which enable the methods illustrated and described in reference to FIGS. 1-2. The data input module includes functionality supporting the input of seismic data, layering/intervals, map views and hand drawings. In other words, the data input module integrates with DSEM™ and the client/video interfaces to execute the functions described in reference to steps 102a, 104a, 104b and 104c in FIG. 1. The data abstraction module integrates with DSEM™ to execute the functions described in reference to step 106 in FIG. 1. In particular, the data abstraction module includes digitization, intelligent point densification, structure/diffusion tensors, structure-oriented smoothing and a fault displacement field components to execute the functions described in reference to steps 201-205 in FIG. 2. The data interpolation module integrates with DSEM™ to execute the functions described in reference to step 108 in FIG. 1.

Although the computing unit is shown as having a generalized memory, the computing unit typically includes a variety of computer readable media. By way of example, and not limitation, computer readable media may comprise computer storage media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through application program interface ("API"), which may reside on a separate computing unit connected through a computer system or network. For example only, a hard disk drive may read from or write to nonremovable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A computer-implemented method for modeling a three-dimensional ("3D") geological structure, which comprises:
    calculating a structure and diffusion tensor field for a digitized image of the geological structure;
    processing the digitized image to form an enhanced image;
    calculating a fault displacement field for the digitized image using a computer processor; and
    interpolating the structure and diffusion tensor field, the enhanced image and the fault displacement field to produce a 3D geological model.

2. The method of claim 1, further comprising digitizing an image of the geological structure represented by input data, the digitized image comprising multiple sample points, each tensor is linked with a respective sample point at an optimized sample point location for the respective sample point based on a nearest neighbor search or a natural-neighbor search.

3. The method of claim 2, wherein the digitized image is processed using structure-oriented smoothing, which comprises at least one of coherency-enhancing anisotropic filters, structure-oriented interpretation filters, recursive (anisotropic) Gaussian filters and bilateral filters.

4. The method of claim 3, wherein calculating the fault displacement field for the digitized image comprises searching for apparent displacement vectors in the digitized image and searching for locations of peaks of local cross-correlations between adjacent-vertical traces for the digitized image.

5. The method of claim 4, wherein calculating the fault displacement field for the digitized image may be applied to any format of digitized data pertaining to structural information.

6. The method of claim 1, wherein the step of interpolating comprises natural-neighbor interpolation.

7. The method of claim 1, wherein the step of interpolating comprises image-guided-blended-neighbor interpolation.

8. A non-transitory computer readable medium tangibly carrying computer executable instructions for modeling a three-dimensional ("3D") geological structure, the instructions being executable to implement:
    calculating a structure and diffusion tensor field for a digitized image of the geological structure;
    processing the digitized image to form an enhanced image;
    calculating a fault displacement field for the digitized image; and
    interpolating the structure and diffusion tensor field, the enhanced image and the fault displacement field to produce a 3D geological model.

9. The computer readable medium of claim 8, further comprising digitizing an image of the geological structure represented by input data, the digitized image comprising multiple sample points, each tensor is linked with a respective sample point at an optimized sample point location for the respective sample point based on a nearest neighbor search or a natural-neighbor search.

10. The computer readable medium of claim 9, wherein the digitized image is processed using structure-oriented smoothing, which comprises at least one of coherency-enhancing anisotropic filters, structure-oriented interpretation filters, recursive (anisotropic) Gaussian filters and bilateral filters.

11. The computer readable medium of claim 10, wherein calculating the fault displacement field for the digitized image comprises searching for apparent displacement vectors in the digitized image and searching for locations of peaks of local cross-correlations between adjacent-vertical traces for the digitized image.

12. The computer readable medium of claim 11, wherein calculating the fault displacement field for the digitized image may be applied to any format of digitized data pertaining to structural information.

13. The computer readable medium of claim 8, wherein the step of interpolating comprises natural-neighbor interpolation.

14. The computer readable medium of claim 8, wherein the step of interpolating comprises image-guided-blended-neighbor interpolation.

\* \* \* \* \*